March 19, 1957  M. E. JENSEN  2,785,614
TRACTOR DRAWN SULKY
Filed Aug. 27, 1954  3 Sheets-Sheet 1
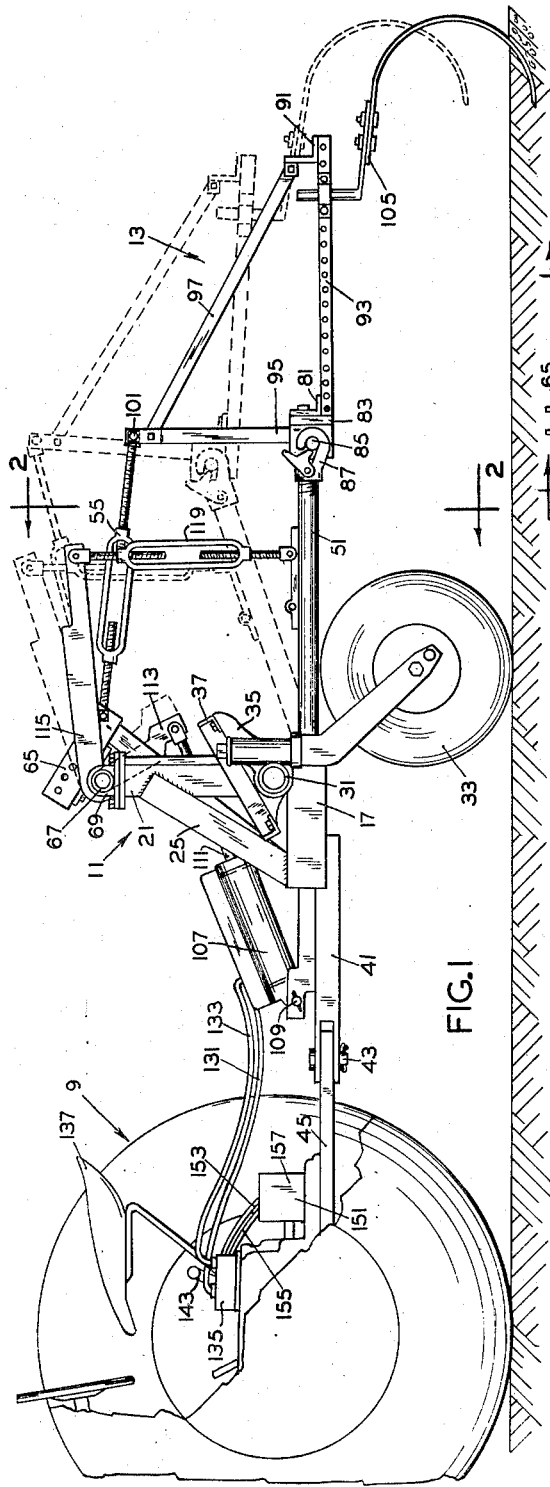
INVENTOR.
MELVIN E. JENSEN
BY
Buckhorn and Cheatham
ATTORNEYS March 19, 1957   M. E. JENSEN   2,785,614
TRACTOR DRAWN SULKY
Filed Aug. 27, 1954   3 Sheets-Sheet 2

INVENTOR.
MELVIN E. JENSEN
BY
Buckhorn and Cheatham
ATTORNEYS

March 19, 1957 M. E. JENSEN 2,785,614
TRACTOR DRAWN SULKY

Filed Aug. 27, 1954 3 Sheets-Sheet 3

INVENTOR.
MELVIN E. JENSEN
BY
Buckhorn and Cheatham
ATTORNEYS

United States Patent Office 2,785,614
Patented Mar. 19, 1957

2,785,614

TRACTOR DRAWN SULKY

Melvin E. Jensen, Nyssa, Oreg.

Application August 27, 1954, Serial No. 452,497

3 Claims. (Cl. 97—46.27)

This invention relates to a tractor drawn tool or implement supporting sulky, and particularly to such a sulky adapted to support agricultural tools or implements.

Heretofore, tractor drawn agricultural implement supporting sulkies have been designed with the implement permanently mounted thereon, thus making it necessary to have a sulky unit for each implement. Furthermore, the implement has been mounted so that the working angle thereof is substantially changed when the implement is elevated, thus making it impractical to operate the implement at other than substantially one working depth.

A main object of the present invention is to provide a sulky of the character above mentioned, having an implement supporting arrangement adapted for detachable connection to the implement whereby different implements may be interchangeably mounted on a single sulky.

A further object of the present invention is to provide a simple sulky of the character just described wherein the supporting arrangement is designed to provide for vertical adjustment of the tool or implement and to maintain a proper substantially constant working angle of the tool or implement at various working depths.

A further object of the present invention is to provide a sulky of the above character carrying power means adapted to control the position of the implement, the power means in turn being controlled by a mechanism mounted on the tractor.

Another object of the present invention is to provide a sulky having a supporting arrangement of the above character including a parallel linkage mechanism operable when actuated to raise and lower the tool or implement and while doing so to maintain a desired working angle.

A still further object of the present invention is to provide a combination including a tractor drawing a sulky of the above type, the sulky supporting a tool or implement for vertical movement, such movement being caused by power means on the sulky controlled from the tractor.

A further object is to provide a sulky constructed to permit an implement mounted thereon readily to follow a curved path along which a tractor is driven without the implement being subjected to forces tending to move the implement laterally of the path.

Various other objects of the present invention will be apparent from the following description taken in connection with the accompanying drawings, wherein:

Fig. 1 is a side elevation showing a sulky embodying the concepts of the present invention supporting an agricultural implement and being drawn by a tractor, the implement being shown in full lines in a lowered position and in broken lines in an elevated position;

Fig. 2 is a sectional view in elevation taken along line 2—2 of Fig. 1;

Fig. 6 is a schematic view of a hydraulic circuit incorporated in the apparatus.

Figure 3:
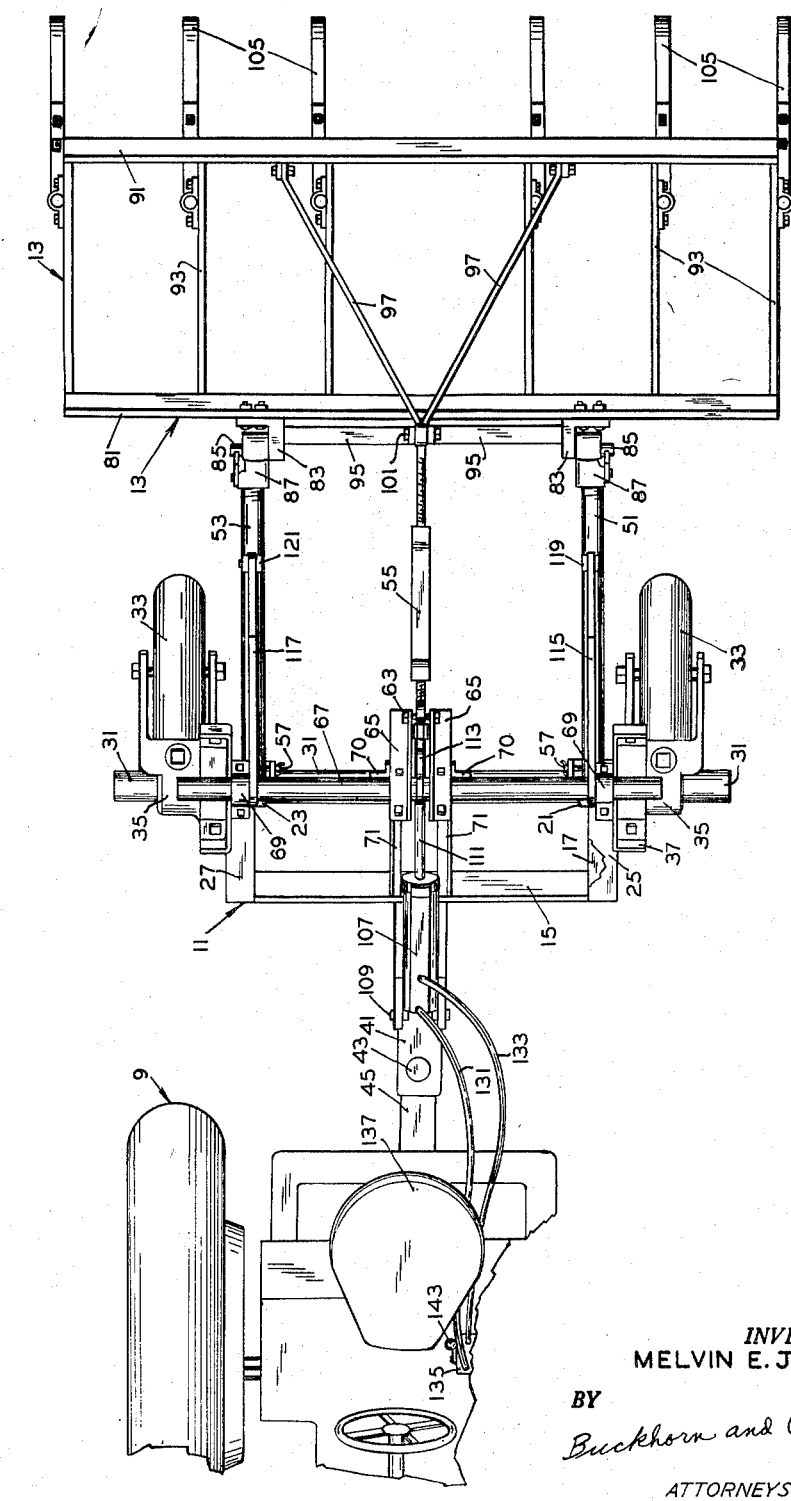
Fig. 3 is a plan view of the arrangement shown in Fig. 1.
Figure 4:
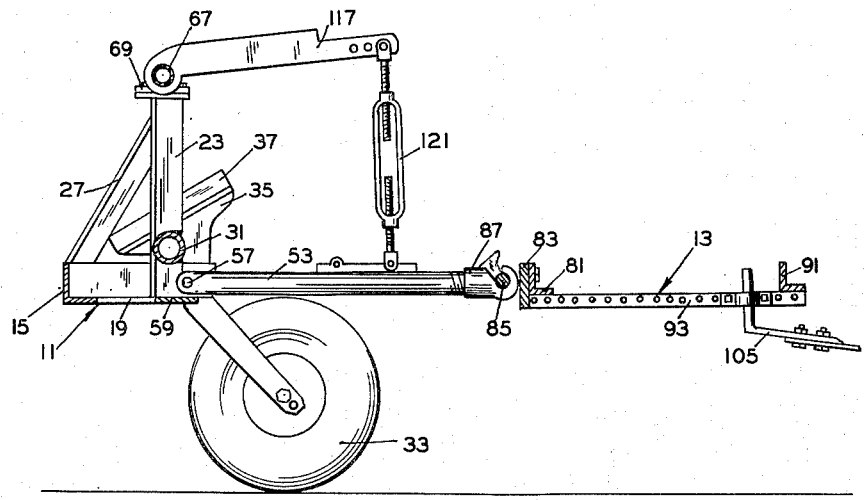
Fig. 4 is a sectional view taken along line 4—4 of Fig. 2, more clearly showing the manner of mounting and elevating the lift arms.

Referring to the accompanying drawings wherein similar reference characters designate similar parts throughout, there is disclosed a tractor of conventional design indicated generally by the reference numeral 9, the tractor being shown as drawing a sulky 11 embodying the concepts of the present invention. The sulky supports an implement or tool, indicated generally by the reference numeral 13, the particular implement shown being an agricultural or farm implement of the cultivator type and being of conventional construction.

Referring particularly to Figs. 1, 2 and 3, the sulky has a frame including a front piece 15 secured at its ends to a pair of rearwardly extending side pieces 17 and 19. Adjacent the rear ends of the side pieces are secured a pair of uprights 21 and 23, the latter being braced by diagonal pieces 25 and 27, respectively. The above-mentioned pieces are formed of angle iron, but the frame could be formed of other shaped pieces or be formed to have a different configuration than the one shown. The sulky frame also includes a horizontal, tubular member 31 which projects outwardly, see Fig. 2, beyond the uprights 21, said uprights being recessed to accommodate the tubular member and being welded at the edges defining such recesses to the tubular member.

The sulky frame is supported by a pair of single wheel casters 33, the upper ends of which are swivelly mounted within journal structures 35. The journal structures are mounted on tubular frame member 31 and are prevented from rotation by being detachably secured by bolts to inclined brackets 37 fixed to uprights 21 and 23.

Projecting forwardly from the sulky frame and fixed thereto is a tongue 41, which is detachably connected by a clevis-type hitch connection at 43 to the drawbar 45 of the tractor 9.

Figure 5:
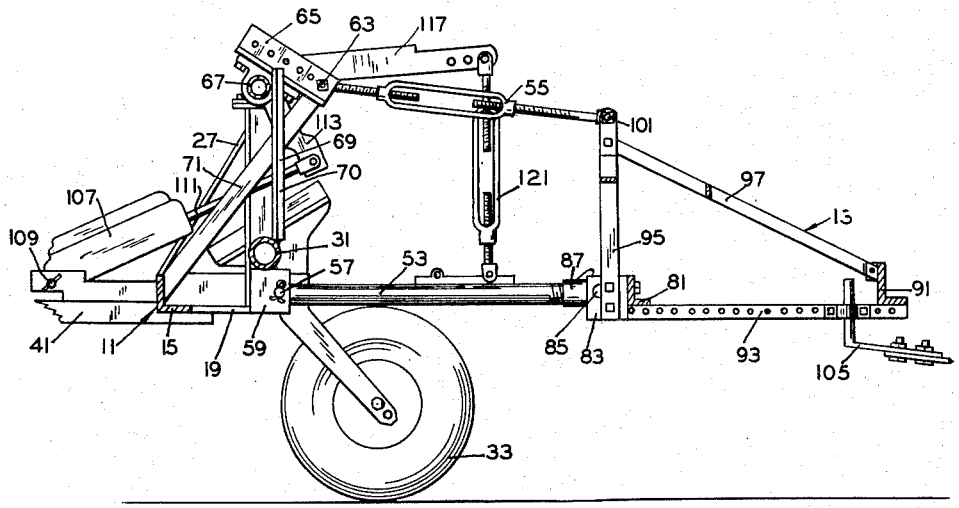
Fig. 5 is a sectional view taken along line 5—5 of Fig. 2, showing more fully how the stabilizing arm or link is mounted.

A parallel linkage arrangement is provided on the sulky for connection to the tool or implement 13. This linkage arrangement includes two lift arms 51 and 53 projecting rearwardly from the sulky frame, and a stabilizing link or arm 55, which is disposed laterally between, but at a level higher than, arms 51 and 53, see Fig. 2. Arms 51 and 53 are shown as being tubular in shape and have their forward ends pivotally mounted by means of shafts or pins 57 in hangers, which include angle pieces 59 secured at one set of ends to the side frame pieces 17 and 19 and at their other set of ends to tubular frame member 31, see Figs. 2 and 5.

Stabilizing link 55 is a turnbuckle having the forward end thereof adjustably mounted by means of a suitable bolt and nut 63 in selected holes provided in the upstanding portion of a pair of spaced-apart supports 65, which are mounted on a crankshaft 67, about which more will be presently said. For now, suffice it to say that the ends of the crankshaft are journaled by bearings 69 on the upper ends of uprights 21 and 23. Supports 65 are held in fixed positions by bracing strips 70 and 71 connected at their upper ends to the supports and at their lower ends to tubular frame member 31 and front frame piece 15, respectively, see Fig. 5.

The rear ends of arms 51 and 53 and the rear end of link 55 are adapted to be connected at two laterally spaced lower points and a single upper point to implement 13. The implement has a frame structure designed to permit it to be supported at three points. To this end, the implement frame includes a front, laterally extending frame member 81 having a pair of spaced brackets 83, each of which carries a fixed, laterally extending pin or shaft 85. Connected to the rear end of each of the lift arms is a conventional knuckle-and-keeper type detachable connecting device 87, the knuckle portion of which is adapted to receive the associated pin 85 therein, and the pivoted keeper portion of which is adapted to assume a position blocking exit of the pin 85 from the knuckle, see Fig. 1.

The implement 13 also conventionally includes a second laterally extending frame member 91, which is fixedly held in spaced relation with respect to frame member 81 by a plurality of laterally spaced tool bars 93 fixed to the frame members. Supported by the tool bars 93 are a plurality of cultivator claws 105 of conventional construction.

An upstanding A frame is provided on the implement, and similar frames are provided on other implements to permit interchanging the implements. The upstanding A frame is constructed as follows. Fastened at their lower ends to bracket 83 are two strips 95 which extend upwardly and inwardly toward one another and have their upper ends bent to extend vertically. Between these upper ends are secured the upper ends of a pair of strips 97 which extend rearwardly and diverge outwardly and have their lower ends secured to frame member 91, see Fig. 3. The rear end of stabilizing link 55 is detachably fastened between the upper ends of strips 95 by a nut and bolt at 101, the rear end of the stabilizing link having an eye through which the bolt passes.

Power means are provided on the sulky for positively raising and positively lowering implement 13, and these means include a double-acting hydraulic piston and cylinder unit at 107. Unit 107 has its cylinder pivoted at 109 on tongue 41 and has its piston rod 111 pivotally connected to one end of a crank arm 113. The other end of the crank arm is fixed to crankshank 67 centrally of said shaft. Fixed at their forward ends to the crankshaft at places just inwardly of bearings 69, see Fig. 3, are two crank arms 115 and 117, the rear ends of said arms being pivotally connected to the upper ends of a pair of lift links 119 and 121, respectively. The lift links are shown as constituting turnbuckles, the lower ends of which are pivotally connected to lift arms 51 and 53, respectively.

Hydraulic fluid is supplied to or discharged from the cylinder of unit 107 through flexible conduits 131 and 133, which are connected at one set of ends to the cylinder, see Fig. 6, and at the other set of ends to a conventional valve 135 mounted on a tractor adjacent the operator's seat 137, see Fig. 1. Referring to Fig. 6, the valve 135 is shown as including a rotary valve element 141, the position of which is controlled by a handle 143 connected to the shaft of the element. In the position shown, hydraulic fluid supplied by pump 151 is conducted by a conduit 153 to valve 135 and through the valve to conduit 133, to apply pressure to the right-hand side of the piston of the unit. Fluid at the left-hand side of the piston is conducted through conduit 131 to the valve, and from the valve through an outlet line 155 to a reservoir 157. The reservoir is connected to pump 151.

Instead of employing a valve having a rotary element, a valve of the spool type could as readily be used.

When the handle 143 of valve 135 is swung to the dotted-line position shown in Fig. 6, the valve element 141 will assume the dotted-line position and cause reverse movement of the piston of unit 107 to elevate or raise the implement 13 by elevating the crank arms 115 and 117 which, in turn, elevate lift arms 51 and 53. It is evident from Fig. 1 that the working angle of the claws will be maintained by the parallel linkage arrangement substantially constant for various working depths of the claws.

By the present invention, an implement supporting sulky has been provided having a three-point parallel linkage implement supporting arrangement adapted for detachable connection to an implement whereby different tools or implements may readily be interchangeably mounted on the sulky. Any tool or implement mounted on the sulky may be held in various vertical positions through the operation of the hydraulic circuit shown in Fig. 6. In each of such positions the working angle of the tool or implement will be maintained substantially constant. A considerable advantage of the sulky of the present invention is that the implement supported by the sulky may be positively raised and lowered without substantially lessening the traction of the rear drive wheels of the tractor.

The concepts of the present invention have been shown as embodied in a three-point parallel linkage arrangement, because various agricultural implements conventionally are provided with an upstanding three-point A frame of the type disclosed in the drawings. However, it will be apparent to those skilled in the art that other parallel linkage arrangements adapted for connection to an implement frame at more or less than three points could be constructed following the concepts of the present invention.

It is further pointed out that since the detachable connecting means at 101 and 85, 87 are disposed rearwardly of the wheels 33, the implement 13 engages the soil at a place rearwardly of the wheels. The hitch means at 43 provides for pivotal movement of the sulky relative to the tractor so that the tractor may be driven along a curved path, and since the wheels 33 may caster about vertical axes, the implement 13 will readily follow the curved path along which the tractor is driven without the implement being subjected to forces tending to move the implement laterally of the path.

Having described the invention in what is considered to be the preferred embodiment thereof, it is desired that it be understood that the invention is not to be limited by the specific details shown unless they constitute critical features of the present invention, all of which will be apparent by reference to the following claims.

I claim:

1. A farm implement supporting device comprising a sulky including a frame having a forward end equipped with hitch means for connection to the rear end of a tractor, wheels supporting said frame, implement lifting mechanism on said frame including detachable connection means disposed in spaced relation rearwardly of said wheels for releasably supporting an implement in a position for engaging the soil at a place spaced rearwardly of said wheels, said hitch means providing for pivoting of said sulky relative to said tractor about a vertically extending axis at the front end of said sulky, said wheels being attached to said frame so as to caster about vertically extending axes when said sulky and implement are being drawn by a tractor along a curved path to thereby enable said implement to follow said curved path without being subjected to forces tending to move said implement laterally of said path.

2. A farm implement supporting device comprising a sulky including a frame having forward and rearward ends, hitch means at said forward end for connection to a tractor, a pair of longitudinal laterally spaced lifting arms pivotally mounted at their forward ends on said frame, detachable connecting means on the rear ends of said lifting arms for releasable attachment to a farm implement, a longitudinal stabilizing link disposed above and laterally between said arms and being pivotally mounted at its forward end on said frame, detachable connecting means at the rear end of said link for releasable attachment to said implement at a place above and laterally spaced between said lifting arms, and power means on said frame for raising said arms.

3. A farm implement supporting device comprising a sulky having a frame, said frame having a forward end and a rearward end, hitch means at the forward end of said frame for connection to the rear end of a tractor, a pair of laterally spaced lifting arms extending longitudinally of said frame and being pivotally mounted at their forward ends on said frame at substantially the same level, means on the rear ends of said lifting arms for connection to a farm implement at laterally spaced points of said implement, a stabilizing link disposed above and laterally between said arms, said link extending longitudinally of the sulky and being pivotally mounted at its forward end on said frame and having means at its rear end for connection to said implement at a place above and laterally spaced between said points of connection of the rear ends of said lifting arms to said implement, power means for raising said arms including a crank shaft journaled in said frame at a level above the pivotal connections of said arms to said frame, a first crank arm fixed to said crank shaft, a piston and cylinder unit coupled between said first crank arm and said frame for turning said crank shaft, second and third crank arms fixed at one set of ends to said crank shaft in laterally spaced relation and extending rearwardly from said shaft in positions overlying the respective lifting arms, and a lift link connecting each of said second and third crank arms to the associated lift arms, whereby operation of said piston and cylinder unit will actuate said lifting arms.

References Cited in the file of this patent
UNITED STATES PATENTS

| | | |
|---|---|---|
| 2,580,532 | Dugger | Jan. 1, 1952 |
| 2,619,016 | Dooley | Nov. 25, 1952 |
| 2,678,596 | Todd | May 18, 1954 |
| 2,689,514 | Ferguson | Sept. 21, 1954 |
| 2,691,932 | Sawyer et al. | Oct. 19, 1954 |